(12) United States Patent
Bunquin et al.

(10) Patent No.: US 9,120,984 B2
(45) Date of Patent: *Sep. 1, 2015

(54) TRANSITION METAL CATALYSTS FOR HYDRODESULFURIZATION

(71) Applicant: GOVERNORS OF THE UNIVERSITY OF ALBERTA, Alberta (CA)

(72) Inventors: Jeffrey Camacho Bunquin, Alberta (CA); Jeffrey Mark Stryker, Alberta (CA)

(73) Assignee: Governors of the University of Alberta (CA)

( * ) Notice: Subject to any disclaimer, the term of this patent is extended or adjusted under 35 U.S.C. 154(b) by 245 days.

This patent is subject to a terminal disclaimer.

(21) Appl. No.: 13/725,547

(22) Filed: Dec. 21, 2012

(65) Prior Publication Data

US 2014/0174989 A1     Jun. 26, 2014

(51) Int. Cl.
| | |
|---|---|
| *C10G 45/06* | (2006.01) |
| *C10G 49/04* | (2006.01) |
| *B01J 31/18* | (2006.01) |
| *C10G 45/04* | (2006.01) |

(52) U.S. Cl.
CPC ............... *C10G 45/06* (2013.01); *B01J 31/189* (2013.01); *C10G 45/04* (2013.01); *C10G 49/04* (2013.01)

(58) Field of Classification Search
CPC ......... C10G 45/06; C10G 49/04; B01J 23/74; B01J 23/745; B01J 23/75; B01J 23/755; B01J 27/1853; B01J 31/18; B01J 31/1805; B01J 31/189; B01J 31/28
USPC .................................................. 208/217, 295
See application file for complete search history.

(56) References Cited

U.S. PATENT DOCUMENTS

| | | |
|---|---|---|
| 6,239,061 B1 | 5/2001 | Wang et al. |
| 6,846,769 B2 | 1/2005 | Arndt-Rosenau et al. |

FOREIGN PATENT DOCUMENTS

| | | |
|---|---|---|
| CA | 2605077 | 4/2009 |
| EP | 0881233 | 12/1998 |
| EP | 0890581 | 1/1999 |
| WO | WO 00/05236 | 2/2000 |
| WO | WO 00/05238 | 2/2000 |
| WO | WO 01/19512 | 3/2001 |
| WO | WO 2009/043156 | 4/2009 |
| WO | WO 2009/043157 | 4/2009 |

OTHER PUBLICATIONS

Dehnicke et al., "Phosphoraneiminato complexes of transition metals," Coordination Chemistry Reviews, 1999, vol. 182, Iss. 1, pp. 19-65.
Guérin et al., "Synthesis, Structure, and Reactivity of the Phosphinimide Complexes $(t\text{-}Bu_3PN)_nMX_{4-n}(M=Ti, Zr)$," Organometallics, 2000, vol. 19, Iss. 16, pp. 2994-3000.
Klien et al., "Novel Imido- and Phosphorane-Imido-Nickel(II) Complexes. Crystal and Molecular Structure of $(\mu_3\text{-}NH)(\mu3\text{-}NPMe_3)(NiClPMe_3)_3$," Journal of the American Chemical Society, 1991, vol. 113, pp. 4673-4675.
Mast et al., "Vinyl-type polymerization of norbornene by a nickel-based catalyst with phosphoraneiminato ligands," Macromolecular Rapid Communications, 1999, vol. 20, Iss. 4, pp. 232-235.
Ramos et al., "Titanium ferrocenyl-phosphinimide complexes," Dalton Transactions, 2010, vol. 39, Iss. 5, pp. 1328-1338.
Riese et al., Cobalt(II)-organische Phosphaniminato-Komplexe mit Heterocuban-Struktur. Kristallstrukturen von $[CoBr(NPR_3)]_4$ mit R =Me, Et,$[Co(C\equiv C\text{-}CME_3)NPMe_3)]_4$ und $[Co(C\equiv C\text{-}SiMe_3)(NPEt_3)]_4$, Zeitschrift für anorganische und allgemeine Chemie (Journal of Inorganic and General Chemistry), 1998, vol. 624, Iss. 8, pp. 1279-1284.
Schroers et al., "Grafting of Vinyl-Type Polynorbornene on Polybutadiene and Polyisoprene," Macromolecular Chemistry and Physics, 2002, vol. 203, Iss. 18, pp. 2658-2664.
Yadav et al., "Phosphinimide complexes with pendant hemilabile donors: synthesis, structure and ethylene polymerization activity," Dalton Transactions, 2009, Iss. 9, pp. 1636-1643.

*Primary Examiner* — Renee E Robinson
(74) *Attorney, Agent, or Firm* — Sheridan Ross P.C.

(57) ABSTRACT

Phosphoranimide-metal catalysts and their role in hydrodesulfurization are disclosed. The catalysts comprise of first row transition metals such as nickel, cobalt and iron. The catalysts have a metal to anionic phosphoranimide ratio of 1:1 and catalyze hydrodesulfurization of a range of sulfur-containing organic compounds under lower temperature and pressure conditions than those commonly used in industrial hydrodesulfurization.

22 Claims, No Drawings

TRANSITION METAL CATALYSTS FOR HYDRODESULFURIZATION

FIELD

The disclosure relates to transition metal catalysts and the role of these catalysts in mediating hydrodesulfurization reactions of a range of organic compounds with at least one carbon-sulfur bond. More particularly, the disclosure relates to phosphoranimide-transition metal catalysts having a phosphoranimide to metal ratio of 1:1 and a method of hydrodesulfurization of a range of organic compounds including dibenzothiophenes, benzothiophenes, thiophenes, thiols and sulfide ethers.

BACKGROUND

Transition metal catalysis remains a key enabling technology for the production of fuel. The petroleum upgrading process, particularly hydrotreatment, involves the reductive cleavage of polar bonds such as carbon-sulfur and carbon-nitrogen bonds, processes commonly referred to as hydrodesulfurization (HDS) and hydrodenitrogenation (HDN), respectively. The efficient and complete removal of sulfur and nitrogen atoms is desired for the production of environmentally safe fuel because the combustion of sulfur- and nitrogen-containing components of petroleum results in increased emission of gaseous pollutants ($SO_x$ and $NO_x$) to the atmosphere.

Current hydrotreatment catalyst technologies are energy intensive (R. R. Chianelli et al. Catalysis Today 147 (2009) 275-286). This is due in part to the reaction conditions required for the metal catalysts to function. For example, cobalt- and nickel-promoted catalysts, such as $CoMoS_2$ and $NiWS_2$, generally function at high temperatures and high hydrogen pressures. These heterogeneous catalysts, in some cases, function at temperatures ranging from 300-650° C. and hydrogen pressures ranging from 90 to 120 atm or higher. The range of process conditions varies with catalyst formulation. These high temperature and high pressure conditions add to the refining costs of petroleum and crude oil. Hence, there remains a demand for cost-effective catalyst technologies for petroleum upgrading.

Industrial HDS and HDN catalysts generally comprise second- and third-row transition metals such as molybdenum, tungsten and platinum, usually in combination with ruthenium, cobalt or nickel promoters. The utilization of these relatively expensive and rare transition metals further raise barriers for the sustainability of industrial hydrotreatment. Hence, it is desirable to obtain high activity catalysts for HDS and HDN from inexpensive and terrestrially abundant first-row transition metals.

First-row transition metal catalysts have traditionally been believed to possess intrinsically low activity. However, results of studies on commercial $CoMoS_2$ catalysts can be interpreted to suggest that the active sites of the catalysts may be the cobalt rather than the molybdenum centers. Examples of these studies are detailed in papers such as (1) Duchet, J. C.; van Oers, E. M.; de Beer, V. H. J.; Prins, R. *J. Catal.* 1983, 80, 386; (2) Vissers, J. P. R.; de Beer, V. H. J.; Prins, R. *J. Chem. Soc. Farady Trans. I.* 1987, 83, 2145. These results suggest that catalysts containing transition metals such as cobalt may be useful in catalysis. In particular, late first-row transition metals such as Fe, Co and Ni are relatively inexpensive and abundant, making them good candidates for use in HDS and HDN.

SUMMARY OF THE INVENTION

According to one aspect, there is provided a method of catalyzing a hydrodesulfurization reaction comprising reacting an organic substrate having at least one carbon-sulfur bond with a catalyst of general formula:

where:
M is a first row transition metal having a +1 oxidation state; n is a whole number; the ratio of M to $R_3PN^-$ in the catalyst is 1:1; $-R_3PN^-$ is a monoanioinic phosphoranimide ligand of structure:

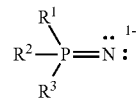

where:
$R^1$, $R^2$, $R^3$ can be the same group or different groups; $R^1$, $R^2$, $R^3$ are independently alkyl (C1-18, primary, secondary or tertiary alkyl), cycloalkyl (C3-C8), aryl/heteroaryl, substituted aryl/heteroaryl or an inert functional group containing at least one heteroatom; and $R^1$, $R^2$, $R^3$ may be linked to give cyclic systems.

In one embodiment, the catalyst has formula $[M(NPR_3)]_n$ where n is a whole number of at least 2. In another embodiment, n is 2 to 8.

According to another aspect, there is provided a method of catalyzing the hydrodesulfurization of an organic compound having at least one carbon-sulfur bond comprising reacting the organic substrate with a catalyst selected from the group consisting of $[Fe(NP^tBu_3)]_4$, $[Co(NP^tBu_3)]_4$ and $[Ni(NP^tBu_3)]_4$.

According to a third aspect, there is provided a method of catalyzing the hydrodesulfurization of an organic substrate comprising: reacting the organic substrate with a catalyst of Formula $[M(NPR_3)]_n$ wherein n=is a whole number; the ratio of M to $NPR_3$ in the catalyst is 1:1; M is a first row transition metal selected from the group consisting of Fe, Co and Ni; $NPR_3$ is:

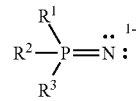

where:
$R^1$, $R^2$, $R^3$ are independently alkyl (C1-C18, primary, secondary or tertiary alkyl), cycloalkyl (C3-C8), aryl/heteroaryl, substituted aryl/heteroaryl and an inert functional group containing at least one heteroatom selected from the group consisting of a Group 14, Group 15 and Group 16 element, excluding C; and wherein $R^1$, $R^2$, $R^3$ may also be linked by aliphatic groups to give cyclic systems; wherein the reaction is carried out at a temperature range of about 90 to 300° C. in the presence of a reducing agent selected from the group consisting of hydrogen and an organic silyl hydride.

In one embodiment, the catalyst has formula $[M(NPR_3)]_n$ where n is a whole number of at least 2. In another embodiment, n is 2 to 8.

In one embodiment, the reaction is carried out in toluene or tetrahydrofuran.

According to a fourth aspect, there is provided, a process for hydrodesulfurization of an organic substrate having at least carbon-sulfur bond comprising: (i) combining the said organic substrate with a transition metal complex of Formula I and a reductant selected from hydrogen and an organic silyl hydride to obtain a reaction medium; (ii) allowing the catalyst to catalyze the hydrodesulfurization of the substrate in an organic substrate selected from toluene and tetrahydrofuran; (iii) obtaining the desulfurized products derived from the organic substrate; wherein the organic substrate is an aromatic or aliphatic compound containing at least one carbon-sulfur bond; and wherein the ratio of the catalyst to the organic substrate is less than 1:1, and wherein the complex of Formula II is:

$$[M(NPR_3)]_n$$

where n is a whole number; the ratio of M to $NPR_3$ is 1:1; M is a first row transition metal selected from the group consisting of Fe, Co and Ni; $NPR_3$ is:

$$R^2 - \underset{R^3}{\overset{R^1}{\overset{|}{P}}} = \ddot{N}:^{1-}$$

where:

$R^1, R^2, R^3$ are independently alkyl (C1-C18, primary, secondary or tertiary alkyl), cycloalkyl (C3-C8), aryl/heteroaryl, substituted aryl/heteroaryl or an inert functional group containing at least one heteroatom selected from the group consisting of a Group 14, Group 15 and Group 16 element; and wherein $R^1, R^2, R^3$ may also be linked by aliphatic groups to give cyclic systems.

In one embodiment, the catalyst has formula $[M(NPR_3)]_n$ where n is a whole number of at least 2. In another embodiment, n is 2 to 8.

DETAILED DESCRIPTION

The present disclosure relates to homogeneous ligand-supported coordination complexes that function as catalysts for HDS reactions. The catalysts of the present disclosure are coordinatively unsaturated. Coordinatively unsaturated catalysts are typically less stable and more reactive than coordinatively saturated catalysts, which make them good candidates for various organic transformations. The catalysts described herein comprise at least one metal having a formal oxidation state of +1 bonded to a monoanionic phosphoranimide ligand, the catalysts typically being in the form of a cluster of metal atoms, with the metal atoms bridged by the nitrogen centers of monoanionic phosphoranimide ligands. The metal atoms that comprise the catalysts are first-row transition metals.

The catalysts can function under relatively low temperatures (e.g., about 90 to about 300° C.) and relatively low hydrogen pressures (e.g., about 1 atm to about 100 atm) and can catalyze a range of organic transformations, including HDS. These reaction conditions are milder than the reaction conditions typically required by heterogeneous HDS catalysts. As used herein, the term "mild" is used in reference to temperature conditions lower than about 300° C. and pressure conditions less than about 100 atmospheres. The reaction conditions required for HDS will necessarily vary, being dependent on the catalyst, the substrate and the solvent(s) used, among other factors. It has been observed that the catalysts can function at higher pressures and temperatures than solely the mild conditions just described. Accordingly, in practice, the temperature and pressure range for functionality of the catalysts is quite broad.

The catalysts consist of an assembly of monomeric units having the empirical formula:

$$[M(NPR_3)] \qquad \text{Formula I}$$

where:

the ratio of M to $NPR_3$ is 1:1;
M is a first row transition metal;
$NPR_3$ is:

$$R^2 - \underset{R^3}{\overset{R^1}{\overset{|}{P}}} = \ddot{N}:^{1-}$$

where:

$R^1, R^2, R^3$ are independently alkyl (C1-C18, primary, secondary or tertiary alkyl), cycloalkyl (C3-C8), aryl/heteroaryl, substituted aryl/heteroaryl or an inert functional group containing at least one heteroatom and wherein $R^1, R^2, R^3$ may also be linked by aliphatic groups to give cyclic systems, [(e.g., R1/R2=—$(CH_2)_n$—, where n=3-10].

According to one embodiment, the first-row transition metal may be Fe, Co, Ni or Mn. The Examples below describe catalysts having Co, Fe and Ni as the metal centers as being suitable.

According to one embodiment, the heteroatoms are Group 14, 15 and 16 elements, preferably Si, N or O.

The catalysts of the present disclosure will be referred to, throughout this disclosure, using the following general formula:

$$[M(NPR_3)]_n \qquad \text{Formula II}$$

where:

n is a whole number;
M and $NPR_3$ are as defined above for the compound of Formula I.

In one embodiment, the catalyst has formula $[M(NPR_3)]_n$ where n is a whole number of at least 2. In another embodiment, n is 2 to 8.

The $[M(NPR_3)]_n$ complex can adapt various modes of aggregation to form clusters. As an example, the present disclosure further discloses catalysts having general formula:

$$[M(NPR_3)]_4 \qquad \text{Formula III}$$

wherein M, $NPR_3$ are as defined above for the compound of Formula I.

As a specific, non-limiting example, the catalysts of Formula III are discrete tetrametallic transition metal clusters having the following structural formula:

The metal centers of the catalysts of Formula III are supported by bridging, anionic phosphoranimide ligands. Each tetrametallic cluster consists of four nitrogen-bridged phosphoranimidometal(I) (i.e., the compound of Formula I—MNPR$_3$) monomers.

As a person skilled in the art would appreciate, complexes of Formula II can adapt various modes of aggregation. As a result, the compounds of Formula II represents a library of catalysts. Structurally characterized compounds of Formula III comprise a subclass of catalysts of Formula II. Compounds of Formula III result from the aggregation of four monomeric units of Formula I. Catalysts supported with phosphoranimide ligands of similar electronic and steric properties with, for example, tri-t-butylphosphoranimide may adapt a tetrameric structure. However, unless specifically provided in the example, the catalysts of the present disclosure are not limited to one particular characterized structure.

Based on the structure of Formula III catalysts, it should be apparent that the phosphoranimide (P=N) functional group displaces R$^1$, R$^2$ and R$^3$ away from the metal center allowing for steric accessibility of the metal center. Thus, the metal center is still active, despite the presence of bulky substituents on the phosphoranimide. Each metal center in the Formula III catalysts may have a coordination number of 2 and an oxidation state of +1. The steric accessibility and low-valent nature of the metal centers result in enhanced activity in reductive transformations such as HDS.

As a specific example, in the compounds of Formula I, II, III (discussed above) and IV (discussed below), trialkyl- and triarylphosphoranimides can impart thermal stability depending on the phosphorous substituents. Other substituents can be expected to impart similar stability as well, thus providing a range of catalysts that can be used for the HDS process described herein.

DEFINITIONS

As used herein, the term "alkyl" includes C$_1$ to C$_{18}$ straight chain, branched or cyclic alkyl groups such as, but not limited to, ethyl, propyl, isopropyl and t-butyl.

As used herein, the term "aryl" includes aromatic hydrocarbons as substituents. Aryl groups may have one or more aromatic rings which may be fused or connected by a connecting group or a bond. Specific examples include, but are not limited to phenyl, tolyl, naphthenyl and biphenyl.

As used herein, the term "heteroaryl" includes aromatic hydrocarbons which contain at least one heteroatom. Similar to the aryl groups, heteroaryls may have one or more aromatic rings which may be fused or connected by a connecting group or a bond.

As used herein, the term "inert functional group" designates heteroatom-bearing hydrocarbyl fragments attached via the heteroatom to aryl and heteroaryl ligand substituents, as defined above, or appended to the terminus of a ligand substituent. The former serve to modulate, electronically and/or sterically, the chemical nature of the phosphoranimide ligand(s), modifying but not impeding catalyst performance. The latter can function as a point of further chemical attachment(s) (i.e., derivatization), for example, in order to construct supported heterogeneous catalysts comprising chemically bonded or linked phosphoranimidometal catalyst subunits grafted onto conventional catalyst supports.

As used herein, the term "heteroatom" is a Group 14, 15 or 16 element.

As used herein, the term "derivative" is a functionalized version of a sulfur-containing substrate where the substituent R's are not all hydrogen.

As used herein, the term "pseudohalide" refers to anions with similar properties to halides preferably OSO$_2$R$^-$, where R=Me, Ph, p-Tol, CF$_3$.

Reaction Chemistry

The process of using the catalysts of the present disclosure involves contacting a sulfur-containing substrate with a metal catalyst of general Formula II (i.e. [M(NPR$_3$)]$_n$), as defined above, in the presence of a reducing agent to effect the reductive cleavage of the carbon-sulfur bond(s) in the substrate. In this process, the catalyst breaks the carbon-sulfur bond(s), replacing the sulfur with hydrogen by the action of the reducing agent (vide infra, hydrogen or silane). The sulfur atoms and/or sulfur-containing groups remain with the catalyst. The reducing agent also acts to convert the catalyst-bound sulfur into a reduced form (vide infra, hydrogen sulfide or an alkanethiol or an aromatic thiol). The products of the HDS process are hydrocarbons and/or incompletely desulfurized compounds, such as alkyl and aromatic thiols. In one example, aromatic hydrocarbons or a mixture of aromatic hydrocarbons and aromatic thiols can be produced from the catalytic HDS of diaryl sulfides. In another example, dibenzothiophene and alkyl-substituted dibenzothiophenes can be hydrodesulfurized into the corresponding biphenyl compound or a mixture of biphenyl and thiobiphenyl compounds.

The generalized reaction scheme (General Reaction 1) is shown below:

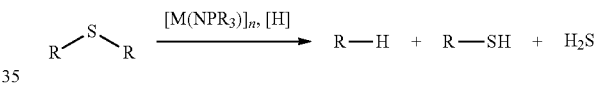

where:
R—S—R is an organic substrate with at least one carbon-sulfur bond;
[M(NPR$_3$)]$_n$ is a catalyst of Formula II as defined above;
[H] is a chemical reducing agent;
R—H is a completely hydrodesulfurized product; and
R—SH is a partially hydrodesulfurized product.

General Reaction 1 is a general reaction equation for the HDS reaction catalyzed by catalysts disclosed herein, showing all possible products that can be obtained from the HDS process using the catalysts disclosed herein. It is noted that the process can produce (1) hydrocarbons (R—H) or (2) partially-desulfurized products (R—SH) or a mixture of hydrocarbons and partially desulfurized products.

The present disclosure further describes a process for HDS wherein a stoichiometric amount of a basic salt is added to scavenge hydrogen sulfide and/or thiols produced during the reaction. The following general reaction ("General Reaction 2") describes this process:

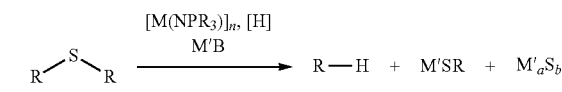

where:
R—S—R is an organic substrate with at least one carbon-sulfur bond;
[M(NPR$_3$)]$_n$ is a catalyst of Formula II as defined above;
[H] is a chemical reducing agent;
M'B is a basic salt to scavenge H$_2$S;

$M'_aS_b$ is a sulfide salt formed from $H_2S$ scavenging, wherein a can be 1 or 2;

b can be 1 or 2;

M'SR is a salt of the partially hydrodesulfurized product; and

R—H is the completely hydrodesulfurized product.

All catalyst loadings where the catalyst to substrate ratio is less than 1:1 can be used for catalytic HDS. Generally, the ratio of substrate to catalyst can be much greater than 1000:1 to 1:1, the catalyst being stable under a range of conditions. The catalyst loadings detailed in the Examples, range from about 1:130 to 1:15. In some cases, the ratio of substrate to catalyst may be 1:4 to 1:200. Suitable catalyst-to-substrate ratios will be dependent on the specific catalyst, concentration, reaction time, and feedstock, among other factors, and can be determined by a person skilled in the art.

The HDS reactions described above as General Reactions 1 and 2 may be carried out, optionally, in an inert organic solvent. By "inert", it is meant that the solvent does not react with or deactivate the catalyst or interfere in the HDS process. For example, halogenated solvents such as, but not limited to, dichloromethane ($CH_2Cl_2$) should generally be avoided. Solvents such as toluene, xylene, decaline, methylnaphthalene or tetrahydrofuran (THF) have been used for certain examples. Toluene and THF have been generally used in the examples described herein. In some embodiments, where the sulfur-containing organic substrate is a liquid or low-melting solid, for example, an organic solvent may not be needed in the reaction. Reactions may also be run under triphasic conditions, also called the slurry phase, where some of the substrate, some of the catalyst, or some of each component are not completely dissolved in the selected solvent. The choice of solvent will vary with the properties of the substrate(s) under reduction.

The chemical reducing agent can be hydrogen ($H_2$) or an organic silyl hydride. When the reducing agent is an organic silyl hydride, the silyl hydride may be chosen from the group of phenylsilane, dimethylphenylsilane and ethylsilane, for example. When hydrogen gas is used as the reducing agent, pressures of 1 atm or higher are typically employed. The reductant is used in an amount sufficient to effectuate the desired level of HDS, which is generally complete HDS. In the case of hydrogen, reactions are routinely run in the presence of an excess of the reductant, or under conditions of constant hydrogen pressure, wherein the reductant is dissolved in the medium is replenished as it is consumed, optimally maintaining a solution saturated in the reductant. In the case of silane, an excess is generally used and no basic scavenger is added to the reduction medium: the silane reacts with the thiol intermediates and any $H_2S$ byproduct formed during the reaction to form silylthioethers and remove the acidic sulfur compounds as they are formed.

In addition, the reaction can be carried out at temperatures ranging from about 90 to about 300° C., or greater. The optimal temperature for the reaction will vary depending on the reactor design, reaction scale, solvent(s), reaction time and chemical feedstock. Based on this disclosure, the optimum reaction temperature for a particular reaction can be determined by those skilled in the art. The catalysts tolerate a broad range of reaction temperatures above the low-temperature threshold for conversion. The temperature and pressure conditions described herein are milder than those typically employed in industrial HDS. Accordingly, these catalysts have potential use in industrial processes such as the catalytic HDS of petroleum feedstocks.

The ratio of the basic metal salts to the sulfur-containing substrate can be greater than 2:1. The examples provided in this disclosure range from 2:1 to 4:1. The basic metal salts used to scavenge $H_2S$ can be selected from the group consisting of Group I and Group II metal hydrides, but are not limited to these groups. For example, Group I metal hydrides may be LiH, NaH, KH or CsH. Group II metal hydrides can be selected from $MgH_2$ and $CaH_2$. The use of metal hydride scavengers is suitable because the reaction between hydride anions and $H_2S$ to produce $H_2$ gas is irreversible. In addition, the basic metal salts employed in the process can be selected from the group consisting of Group I and Group II salts of strong organic bases, preferably with pKa higher than 20, but are not limited to these organic bases. For example, basic Group I and II salts may be amide salts such as lithium diisopropyl amide (LDA), potassium diisopropylamide (KDA), or Grignard reagents (alkyl or aryl magnesium halides).

Purified Catalyst

In one aspect, the process includes the HDS of a range of sulfur-containing organic substrates containing at least one carbon-sulfur bond by introducing a "purified" catalyst of Formula II (i.e. $[MNPR_3]_n$). By "purified", it is meant that the catalyst is subjected to purification methods prior to use for catalytic hydrodesulfurization, as described in the examples provided. The purity may be determined via elemental analysis, for example. To carry out this process, the purified catalysts of Formula II are contacted with an organic substrate having at least one carbon-sulfur bond in the presence of a reducing agent. The reducing agent reacts with the sulfur-containing substrate, converting the carbon-sulfur bonds to carbon-hydrogen bonds. Hydrocarbons or partially desulfurized products (e.g. thiols) or a mixture of hydrocarbons and partially desulfurized products are produced. The process can be carried out using the reaction conditions as described above for General Reactions 1 and 2.

In Situ Prepared Catalyst

Another aspect of the present disclosure relates to the use of an in situ-prepared (or in situ-derived) catalyst in HDS reactions. By "in situ", it is meant that the catalyst is not subject to purification after synthesis. In this embodiment, the catalyst of Formula II $[M(NPR_3)]_n$ is synthesized in situ and used for HDS directly, without isolation or purification. The in situ-derived catalyst is thus produced through the reduction (using an organic silyl hydride or other reducing agents as defined above for General Reaction I and II) of metal-phosphoranimide complexes. The metal-phosphoranimde complexes used as precursors have the general formula shown below.

$$[M(NPR_3)X_{(m-1)}]_n \qquad \text{Formula IV}$$

where:

m=2 or 3;

n=2 to 4;

the M to $R_3PN^-$ ratio is 1:1;

M is a first row transition metal;

$X^-$ can be any halide or pseudohalide;

$R^1, R^2, R^3$ can be the same group or different groups;

$R^1, R^2, R^3$=alkyl (C1-C18, primary, secondary and tertiary alkyl), cycloalkyl (C3-C8), aryl/heteroaryl, substituted aryl/heteroaryl or an inert functional group optionally containing at least one heteroatom; and $R^1, R^2, R^3$ substituents may also be linked by aliphatic hydrocarbyl groups to give cyclic systems [(e.g., R1/R2= 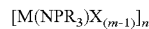$(CH_2)_n$—, where n=3-10].

In one embodiment, the first row transition metal may be Co, Ni, Mn or Fe. In the Examples, Co, Ni and Fe have been found to be suitable.

In one embodiment, the halide may be F⁻, Cl⁻, Br⁻, or I⁻, and the term "pseudohalide" refers to anions with similar properties to halides preferably $OSO_2R^-$, where R=Me, Ph, p-Tol, $CF_3$.

The present disclosure provides a method for the in situ synthesis of the metal complexes of Formula II (i.e. $[M(NPR_3)]_n$) through the reduction of halide-containing metal phosphoranimide complexes of Formula IV: $[MNPR_3X_{(m-1)}]_n$. The in-situ preparation of the catalyst of Formula II is carried out by treating a complex of Formula IV with an appropriate amount of a chemical reducing agent. The synthesis of this in situ-derived catalyst is conducted as shown below:

General Reaction III

where:

$[M(NPR_3)X_{(m-1)}]_n$ is a halide-functionalized metal-phosphoranimide complex of Formula IV as defined above;

[H] is a reducing agent;

$[M(NPR_3)]_n$ is the metal-phosphoranimide catalyst of Formula II as defined above.

"Chemical reducing agents" are reagents used in two classes of reactions described herein: (1) The chemical reducing agents required to effect the desulfurization of sulfur-containing substrates include hydrogen ($H_2$) or an organic silyl hydride; (2) the chemical reducing agents used for the in situ-synthesis of the catalyst of Formula II (i.e. $[M(NPR_3)]_n$) may be a metal such as but not limited to, Li, Na, or K. It should also be apparent to a person skilled in the art that metal reducing agents may exist in various compounded forms such as, but not limited to, sodium naphthalenide, Na(Hg) amalgam, Na—K alloy, or $KC_8$.

The reduction step can be carried out in inert organic solvents such as tetrahydrofuran, hexane, benzene, diethyl ether or toluene, for example. However, halogen-containing solvents, such as $CH_2Cl_2$, for example, are generally unsuccessful in this reduction step.

The ratio of the reducing agent to the total amount of M in the complex of Formula IV $[M(NPR_3)X_{(m-1)}]_n$ may vary depending on the reducing agent. For example, when the reducing agent is Na(Hg) amalgam, the ratio of the reducing agent to complex with Formula III can range from, but not limited to, about 1:1 to 2:1. Ratios higher than of this can be also used for the reduction, but are not necessary. The reduction may be carried out in solvents selected from, but not limited to, tetrahydrofuran, dialkyl ethers, toluene and saturated hydrocarbons such as pentane and hexane.

The reduction step can be conducted at low to ambient temperatures. By "low", it is meant temperatures below about 0° C. and by "ambient", it is meant about normal room temperature. The preferred temperature for the reduction step varies with the complex of Formula IV, the solvent used the concentrations of the various components, and the choice of reducing agent. A person skilled in the art would be able to determine the appropriate reaction temperature. For example, temperatures may range from about −80 to 25° C., when the reaction is carried out in an inert organic solvent. As a specific but non-limiting example, the reduction of $[Cl_2Co_2(\mu\text{-}NP^tBu_3)_2(THF)_2]$ using 1% Na(Hg) amalgam, producing $[Co(NP^tBu_3)]_4$, may be carried out at about −35° C.

The solution from the reduction process, containing the in situ-derived catalyst, $[MNPR_3]_n$, is directly used for HDS without carrying out the purification procedures described in the synthesis of thoroughly characterized and purified catalyst of Formula II (i.e. $[MNPR_3]_n$) and in the synthesis of the unit of Formula I (i.e. $[MNPR_3]$)

The in situ-derived or unpurified catalyst desulfurizes organic substrates with at least one carbon-sulfur bond under the same reaction conditions described for General Reactions 1 and II using the purified catalyst of Formula II (i.e. $[MNPR_3]_n$). The process pertains to contacting an organic molecule with at least one carbon-sulfur bond with the in situ-derived catalyst in the presence of a reducing agent to cause the reducing agent to react with the sulfur-containing substrate, converting all or some of the carbon-sulfur bonds to carbon-hydrogen bonds, to produce hydrocarbons or a mixture of hydrocarbons and partially desulfurized products. The process can be conducted optionally in the presence of an inert organic solvent as described above using "purified catalysts" for HDS.

In another aspect, there is disclosed a method for the synthesis of the in-situ-derived catalyst of Formula II (i.e. $[M(NPR_3)]_n$) from an anionic metathesis reaction between a metal halide ($MX_m$) and an alkali or alkaline metal salt of a phosphoranimide ligand, followed directly by the reduction of this intermediate, as described above. The metal precursor can be a metal salt such as $MX_m$ or a solvated metal salt such as $L_aMX_m$. This reaction is as illustrated below:

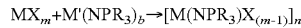

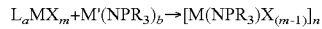

where:

$M'(NPR_3)_b$ is a Group I or Group II metal phosphoranimide salt and wherein the anionic phosphoranimide $R_3PN$— ligand is as defined above;

m=2 to 3;

n=1 to 4;

a=1 to 3;

b=1 or 3;

M to $R_3PN^-$ ratio in the complex of formula $[M(NPR_3)X_{(m-1)}]_n$ is 1:1;

M can be any first row transition metals such as, but not limited to, Mn, Fe, Co and Ni.

X⁻ can be any halide or pseudohalide;

L can be a two-electron dative donor molecule selected from the group of dialkyl ethers such as, but not limited to, tetrahydrofuran, 1,2-dimethoxyethane, dioxane; or selected from the group of trialkylphosphine or a triarylphosphine such as, but not limited to triphenylphosphine or tri-(p-tolyl) phosphine;

M' can be an alkali or alkaline metal. Alkali phosphoranimide salts (i.e. $M'(NPR_3)_b$) employed in the synthesis can include monophosphoranimide salts of lithium, sodium, potassium, and cesium; and alkaline earth metal phosphoranimide salts can include $[Mg(NPR_3)_2]$ and $[Mg(NPR_3)X]$.

The halide may be F⁻, Cl⁻, Br⁻, I⁻ and the pseudohalide may be $OSO_2R^-$ (R=Me, Ph, p-Tol, $CF_3$), for example.

In general, the synthesis of complexes of general Formula IV $[M(NPR_3)X_{(m-1)}]_n$ can be efficiently carried out using M to $R_3PN^-$ ratio of about 1:1 or greater. The suitable ratio of the metal salt to $M'(NPR_3)_b$ varies with the specific metal, leaving group (X) and $M'(NPR_3)_b$ reagent. When b=1 or when a $[Mg(NPR_3)X]$ reagent is used, the ratio of the metal salt to $M'(NPR_3)_b$ used for this synthesis can be about 1:1; however, yields are generally higher in the presence of an excess of the metal salt, for example, at a ratio of 2:1. When b=2, the excess of metal salt is maintained in the range from 2:1 to 4:1 to ensure that the M to $R_3PN^-$ ratio is about 1:1 or greater.

The anionic metathesis can be conducted in low to ambient temperatures. For example, temperatures may range from about −80 to 25° C. when the reaction is carried out in an inert organic solvent. The anionic metathesis reaction is suitably conducted at temperature ranging from about −75 to −35° C., as demonstrated in the synthesis of [Co(NP$^t$Bu$_3$)]$_4$ and [Ni(NP$^t$Bu$_3$)]$_4$, described in the Examples.

Substrates for HDS

The catalysts of Formula II and III of the present disclosure, whether purified or in situ-derived, can be used for the HDS of a range of organic substrates having at least one carbon-sulfur bond. The present disclosure exemplifies substrates that model the sulfur-containing functionality and structural types typically found in petroleum feedstocks. The classes of sulfur-containing substrates known present in petroleum include thiophene derivatives, thiols, sulfide ethers, disulfide ethers, among others. HDS of these compounds is important to address issues relating to the environmental impact of SO$_x$ emission and the economical production of environmentally safe (ultra-low sulfur or sulfur-free) fuels.

As a person skilled in the art would appreciate, the class of organic sulfur-containing substrates that can be reductively desulfurized using the catalysts described herein is very broad. The substituents present on the substrates can be aliphatic, aromatic, unsaturated, contain heteroatoms, be cyclic or linear, possess functional groups, or contain a combination of these features. The common feature underlying these substrates is that they contain at least one carbon-sulfur bond, and the common underlying transformation is that the carbon-sulfur bond is transformed into a carbon-hydrogen bond.

The present disclosure exemplifies the desulfurization of different classes of sulfur-containing organic substrates. Accordingly, as will be discussed below, these catalysts can be used for the HDS of dibenzothiophene and its derivatives. Derivatives are compounds containing the named ring system or subunit but having one or more of the hydrogen atoms replaced (substituted) by a non-hydrogen element. Dibenzothiophene and its derivatives constitute the most refractory sulfur-containing components of petroleum. By refractory, it is meant that these substrates are resistant to catalytic processing due to the strength of the carbon-sulfur bonds and steric inaccessibility of the sulfur-functional group.

An aspect relates to the HDS of dibenzothiophene and dibenzothiophene derivatives. The reaction conditions employed in this process are similar to those described above for General Reaction 1 in relation to the catalyst of Formula II (i.e. [MNPR$_3$]$_n$,). The sulfur-containing substrate can be represented by the following formula:

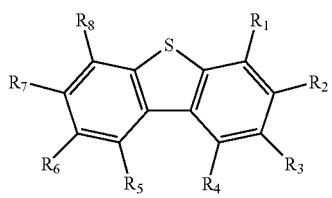

where:
$R^1$, $R^2$, $R^3$, $R^4$, $R^5$, $R^6$, $R^7$, $R^8$ can be the same group or different groups;
$R^1$, $R^2$, $R^3$, $R^4$, $R^5$, $R^6$, $R^7$, $R^8$ can be hydrogen, alkyl (C1-C18, primary, secondary and tertiary alkyl), cycloalkyl (C3-C8), aryl/heteroaryl, substituted aryl/heteroaryl or a functional group optionally containing at least one heteroatom;

any two vicinal R groups may also be linked to give cyclic systems, both aliphatic and aromatic [(e.g., R1/R2=—(CH$_2$)$_n$—, where n=3-10]; and the term "heteroatom" refers to Group 15 and 16 elements, such as N, S and O. As noted, suitable temperatures and pressures will vary as a function of the solvent used, the concentration of the components, the substrate, and the catalyst, among other factors. Similarly, the solvent will vary depending on the structure and properties (i.e., solubility) of the substrate, but can be determined by a person skilled in the art.

The present disclosure present Examples wherein dibenzothiophene and substituted dibenzothiophenes are stoichiometrically or catalytically hydrodesulfurized.

The catalysts of the present disclosure also desulfurize thiophene and thiophene derivatives. The reaction conditions employed in this process are similar to those described for General Reactions 1 and 2 above. The substrate can be represented by the general formula:

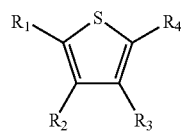

where:
$R^1$, $R^2$, $R^3$, $R^4$ can be the same group or different groups;
$R^1$, $R^2$, $R^3$, $R^4$ can be alkyl (C1-C18, primary, secondary and tertiary alkyl), cycloalkyl (C3-C8), aryl/heteroaryl, substituted aryl/heteroaryl or a functional group optionally containing at least one heteroatom;

any two vicinal R groups may also be linked to give cyclic systems, both aliphatic and aromatic [(e.g., R1/R2=—(CH$_2$)$_n$—, where n=3-10]

the term "heteroatom" refers to Group 15 and 16 elements, such as N, S and O.

The catalysts of the present disclosure also desulfurize benzothiophene and benzothiophene derivatives. The reaction conditions employed in this process are similar to those described above for General Reactions 1 and 2. The substrate can be represented by the general formula:

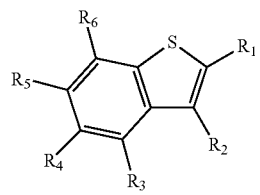

where:
$R^1$, $R^2$, $R^3$, $R^4$, $R^5$, $R^6$ can be the same group or different groups;
$R^1$, $R^2$, $R^3$, $R^4$, $R^5$, $R^6$ can be hydrogen, alkyl (C1-C18, primary, secondary and tertiary alkyl), cycloalkyl (C3-C8), aryl/heteroaryl, substituted aryl/heteroaryl or a functional group optionally containing at least one heteroatom;

any two vicinal R groups may also be linked to give cyclic systems, both aliphatic and aromatic [(e.g., R1/R2=—(CH$_2$)$_n$—, where n=3-10]; and the term "heteroatom" refers to Group 15 and 16 elements, such as N, S and O.

In another embodiment, the catalysts also desulfurize sulfide ethers into hydrocarbons and/or thiols. The reaction conditions employed in this process are similar to those described above for General Reactions 1 and 2. The substrate can be represented by the general formula:

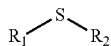

where:
R$^1$, R$^2$ can be the same group or different groups;
R$^1$, R$^2$ can be alkyl (C1-C18, primary, secondary and tertiary alkyl), cycloalkyl (C3-C8), aryl/heteroaryl, substituted aryl/heteroaryl or a functional group optionally containing at least one heteroatom; and
R$^1$ and R$^2$ may also be linked to give cyclic systems, both aliphatic and aromatic [(e.g., R1/R2=—(CH$_2$)$_n$—, where n=3-10]; and
the term "heteroatom" are Group 15 and 16 elements, such as N, S and O. In a specific example, diphenyl sulfide can be desulfurized into a benzene and thiophenol. Prolonged reaction times result in a higher benzene to thiophenol ratio, suggesting that thiophenol, a substrate containing only one carbon-sulfur bond, is desulfurized to produce benzene under the reaction conditions described in this disclosure.

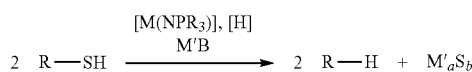

In the case of diaryl ethers, the aromatic rings can be linked by a group E:

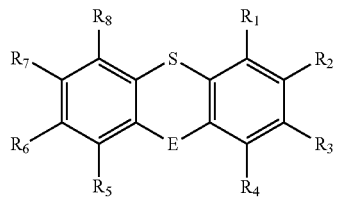

where:
E=alkyl, O, S, NR$^9$
R$^1$, R$^2$, R$^3$, R$^4$, R$^5$, R$^6$, R$^7$, R$^8$, R$^9$ can be the same group or different groups;
R$^1$, R$^2$, R$^3$, R$^4$, R$^5$, R$^6$, R$^7$, R$^8$, R$^9$ can be hydrogen, alkyl (C1-C18, primary, secondary and tertiary alkyl), cycloalkyl (C3-C8), aryl/heteroaryl, substituted aryl/heteroaryl or a functional group optionally containing at least one heteroatom;
any two vicinal R groups may also be linked to give cyclic systems, both aliphatic and aromatic [(e.g., R$^1$/R$^2$=—(CH$_2$)$_n$—, where n=3-10]; and
the term "heteroatom" refers to Group 15 and 16 elements, such as N, S and O. The examples described in this disclosure include substrates of varying steric and electronic properties. In certain substrate classes, the specific substrates chosen represent the most sterically accessible and sterically hindered carbon-sulfur bonds; substrates incorporating sterically hindered carbon-sulfur bonds are not typically known to be desulfurized by homogeneous transition metal catalysts. It should be apparent to a person skilled in the art that substrates containing carbon-sulfur bonds with steric accessibility intermediate to the provided range of examples can be desulfurized by the catalysts described herein. Furthermore, various substituents and degree of substitution are disclosed to illustrate, though not intended to limit, the variations in the electronic properties of the substrates that can be desulfurized by the catalysts described herein. The substituents presented as examples include some of the functional groups known present in sulfur-containing components of petroleum such as, but not limited to, alkyl, aromatic, heteroaromatic and alkoxy groups.

The invention is further described in the following specific examples for illustrative purposes only.

EXAMPLES

In these examples, the following terms are used:
Ar—H=the completely desulfurized organic product from hydrodesulfurization.
Ar—SH=the product of the first C—S bond scission.
STOIC="Stoichiometric conversion" refers to experiments wherein no catalytic conversion for hydrodesulfurization was observed.

Example 1

Synthesis of [Ni(NP$^t$Bu$_3$)]$_4$

A nickel phosphoranimide catalyst having the formula shown below is synthesized as an example:

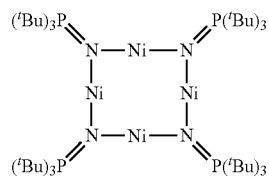

To prepare this catalyst (also referred to as the "Ni(I) catalyst"), 1.62 mmol of (dme)NiBr$_2$ and 0.81 mmol LiNP$^t$Bu$_3$ are separately suspended in 5 mL portions of tetrahydrofuran (THF) in 15 mL screw-capped vials under an inert atmosphere, for example, in a nitrogen- or argon-filled drybox. Both suspensions are cooled to −35° C. in a dry-box freezer for an hour. The LiNP$^t$Bu$_3$ suspension is added drop-wise into the metal halide suspension with occasional stirring over a four-hour period with the temperature constant at −35° C. After the addition of the ligand, the reaction mixture is left in the freezer overnight. The solvent is removed in vacuo and the residue is washed with 4 mL portions of hexane thrice. The residue is dissolved in 7 mL THF, charged with 2.5 mmol of Na delivered using a 1% Na/Hg reagent and stirred overnight. The solvent is evaporated and the product is extracted with pentane and filtered through a plug of Celite. The solvent is removed. This reaction gave an 80% yield. The product precipitates as dark green prismatic crystals from a concentrated THF solution upon cooling to −35° C. The product is characterized by X-ray crystallography, magnetic susceptibility measurement by the Evan's method (Evans, D. F. J. J. Chem. Soc. 1959, 2003-2005, which is herein incorporated by reference) and elemental analysis (vide infra).

The calculated elemental composition of the Ni(I) catalyst is C, 52.41%; H, 9.90%; N, 5.09%. The determined elemental composition is C, 52.38%; H, 9.89%; N, 4.96%. Solution magnetic susceptibility experiments revealed that the Ni(I) catalyst is a 3.50-electron paramagnet ($\mu_{eff}$=4.40$\mu_{Bo}$) at room temperature.

Example 2

Synthesis of [Co(NP$^t$Bu$_3$)]$_4$

A cobalt phosphoranimide catalyst (also referred to herein as the "Co(I) catalyst") having the formula shown below is synthesized as an example:

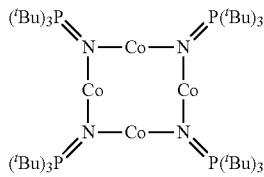

To prepare this catalyst, 1.62 mmol of CoCl$_2$ and 0.81 mmol LiNP$^t$Bu$_3$ are separately suspended in 5 mL portions of tetrahydrofuran (THF) in 15 mL screw-capped vials under an inert atmosphere, for example, in a nitrogen- or argon-filled drybox. Both suspensions are cooled to −35° C. in a dry-box freezer for an hour. The LiNP$^t$Bu$_3$ suspension is added dropwise into the metal halide suspension with occasional stirring over a four-hour period with the temperature constant at −35° C. After the addition of the ligand, the reaction mixture is left in the freezer overnight. The solvent is removed in vacuo and the residue is washed with 4 mL portions of hexane thrice. The residue is dissolved in 7 mL THF, charged with 2.5 mmol of Na delivered using a 1% Na/Hg reagent and stirred overnight. The solvent is evaporated and the product is extracted with pentane and filtered through a plug of Celite. The solvent is removed. This reaction gave a 65% yield. The product precipitates as prismatic dark brown crystals upon cooling to −35° C. The product is characterized by X-ray crystallography, magnetic susceptibility measurement by the Evan's method.

The calculated elemental composition is C, 52.36%; H, 9.89%; N, 5.09%. The determined elemental composition is C, 52.68%; H, 10.09%; N, 4.86%. The solution magnetic susceptibility experiments revealed that the Co(I) catalyst is an 8-electron paramagnet ($\mu_{eff}$=8.98$\mu_{Bo}$) at room temperature.

Example 3

Synthesis of [Co(NP$^t$Bu$_3$)]$_a$ from [Cl$_2$Co$_2$(µ-NP-$^t$Bu$_3$)$_2$(THF)$_2$]

All manipulations in this synthesis were carried out under inert atmosphere, for example, in a nitrogen- or argon-filled drybox. 0.5 mmol of [Cl$_2$Co$_2$(µ-NP-$^t$Bu$_3$)$_2$(THF)$_2$] is dissolved in 5 mL THF and then treated with 1.1 mmol Na(Hg) reagent at −35° C. to room temperature 12 hours. The solvent is evaporated and the product is extracted with pentane and filtered through a plug of Celite. The solvent is removed and a concentrated THF solution of the product is prepared for recrystallization. The product crystallizes as prismatic dark blue crystals upon cooling to −35° C. The product was identical in all respects to the cobalt(I) catalyst described above in Example 2.

Example 4

Synthesis of [Fe(NP$^t$Bu$_3$)]$_n$

An iron phosphoranimide catalyst having the formula [Fe(NP$^t$Bu$_3$)]$_n$ was synthesized.

To prepare this catalyst, 1.62 mmol of (dme)FeBr$_2$ and 0.81 mmol LiNP$^t$Bu$_3$ are separately suspended in 5 mL portions of tetrahydrofuran (THF) in 15 mL screw-capped vials under an inert atmosphere, for example, in a nitrogen- or argon-filled drybox. Both suspensions are cooled to −35° C. in a dry-box freezer for an hour. The LiNP$^t$Bu$_3$ suspension is added dropwise into the metal halide suspension with occasional stirring over a four-hour period with the temperature constant at −35° C. After the addition of the ligand, the reaction mixture is left in the freezer overnight. The solvent is removed in vacuo and the residue is washed with 4 mL portions of hexane thrice. The residue is dissolved in 7 mL THF, charged with 2.5 mmol of Na delivered using a 1% Na/Hg reagent and stirred overnight. The solvent is evaporated and the product is extracted with pentane and filtered through a plug of Celite. The solvent is removed. This reaction forms an amorphous dark brown solid in 50% yield.

Example 5

Hydrodesulfurization of Dibenzothiophene in the Absence of a Basic Scavenger The preparation of reaction mixtures is conducted under an inert atmosphere, for example, in a nitrogen-filled dry box. 50 mg (0.27 mmol) DBT and 20 mg (0.018 mmol) of the catalyst [Ni(NP$^t$Bu$_3$)]$_4$ (or [Co(NP$^t$Bu$_3$)]$_4$) are dissolved in 6 mL toluene. The solution is transferred into a Teflon-sealed glass reactor equipped with a Teflon-sealed magnetic stir bar. The reactor was taken out of the dry box and connected to a hydrogen manifold. The reaction vessel is then charged with H$_2$ (1 atm), employing rigorous inert-atmosphere laboratory techniques. The reaction mixture is then stirred at 1200 rotations per minute (rpm) for 12 hours in an oil bath at 120° C.

The reactor is cooled to room and quenched with a 10% HCl solution. The organic products are extracted through diethyl ether-water extractions using three 4 mL portions of diethyl ether. The diethyl ether fractions are pooled, dried with anhydrous Na$_2$SO$_4$ and filtered through a small column of Florisil. The diethyl ether is removed in vacuo and the residue is dissolved in CDCl$_3$ for $^1$H-NMR and GC-MS analyses. Table 1 shows results of the reactions carried out using [Ni(NP$^t$Bu$_3$)]$_4$ and [Co(NP$^t$Bu$_3$)]$_4$. Only stoichiometric (STOIC) conversion is observed, in the absence of a scavenger for H$_2$S.

TABLE 1

Comparison of the HDS activity of [Co(NP$^t$Bu$_3$)]$_4$ and [Ni(NP$^t$Bu$_3$)]$_4$.

| Entry | Cat | DBT mg (mmol) | Catalyst (mg) | H$_2$ (atm) | Time (h) | Temp (° C.) | Conversion (%) | |
|---|---|---|---|---|---|---|---|---|
| | | | | | | | Ar—H | Ar—SH |
| 1 | [Ni(NP$^t$Bu$_3$)]$_4$ | 50 (0.27) | 20 (0.018) | 1 | 12 | 120 | 12 | 0 |
| 2 | [Co(NP$^t$Bu$_3$)]$_4$ | 50 (0.27) | 20 (0.018) | 1 | 12 | 120 | 10 | 0 | where:

Ar—H is

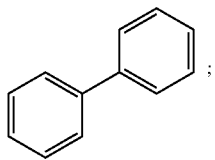
;

Ar—SH is

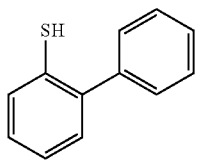

Example 6

Hydrodesulfurization of Dibenzothiophene with Phenylsilane as Reductant and Scavenger The preparation of reaction mixtures is conducted under an inert atmosphere, for example, in a nitrogen-filled dry box. A Teflon-sealed glass reactor is charged with 50 mg (0.27 mmol) DBT, 20 mg (0.018 mmol) [Ni(NP$^t$Bu$_3$)]$_4$, 90 mg (0.83 mmol) PhSiH$_3$, 6 mL toluene and a Teflon-sealed magnetic stir bar. The reaction mixture is stirred vigorously at 1200 rpm and the reactor, is heated to 120° C. in an oil bath for 16 hours.

The reactor is then cooled to room temperature and the reaction mixture filtered through a column of Florisil. The resultant toluene solution was submitted for $^1$H-NMR and GC-MS analysis. This example resulted in a 25% conversion to biphenyl. No other organic products were obtained.

Example 7

Hydrodesulfurization of Dibenzothiophene in the Presence of Lithium Diisopropylamide (LDA)

The preparation of reaction mixtures is conducted under an inert atmosphere, for example, in a nitrogen-filled dry box. A Teflon-sealed reactor is charged with 50 mg (0.27 mmol) DBT, 20 mg (0.018 mmol) [Ni(NP$^t$Bu$_3$)]$_4$, 50 mg (0.47 mmol) LDA, 6 mL toluene and a Teflon-sealed magnetic stir bar. The reactor was taken out of the dry box and connected to a hydrogen manifold. The reaction vessel is then charged with H$_2$ (1 atm), employing rigorous inert-atmosphere laboratory techniques. The reaction mixture is then stirred at 1200 rpm for 16 hours in an oil bath at 120° C.

The reactor is cooled to room and the reaction mixture quenched with a 10% HCl solution. The organic products are extracted through diethyl ether-water extractions using three 4 mL portions of diethyl ether. The diethyl ether fractions are pooled, dried with anhydrous Na$_2$SO$_4$ and filtered through a small column of Florisil. The diethyl ether is removed in vacuo and the residue is weighed and dissolved in CDCl$_3$ for $^1$H-NMR and GC-MS analyses. A 20% conversion of the substrate to biphenyl, the exclusive product, was observed in this example.

Example 8

Hydrodesulfurization of Dibenzothiophene in the Presence of Metal Hydrides

The preparation of reaction mixtures is conducted under an inert atmosphere, for example, in an Argon dry box. A Teflon-sealed reactor, equipped with a Teflon magnetic stir bar, is charged with 100 mg (0.54 mmol) DBT, 10 mg (0.009 mmol) [Ni(NP$^t$Bu$_3$)]$_4$, 27 mg (1.12 mmol) NaH (or, in a separate reaction, 46 mg (1.12 mmol) KH) and 6 mL toluene. The reactor was taken out of the dry box and connected to a hydrogen manifold. The reaction vessel is then charged with H$_2$ (1 atm), employing rigorous inert-atmosphere laboratory techniques. The reaction mixture is stirred vigorously at 1200 rpm and the reactor, is heated to 120° C. in an oil bath for 8 hours.

The reactor is cooled to room and the reaction mixture quenched with a 10% HCl solution. The organic products are extracted through diethyl ether-water extractions using three 4 mL portions of diethyl ether. The diethyl ether fractions are pooled, dried with anhydrous Na$_2$SO$_4$ and filtered through a small column of Florisil. The diethyl ether is removed in vacuo and the residue is weighed and dissolved in CDCl$_3$ for $^1$H-NMR and GC-MS analyses. Table 2 shows the results of hydrodesulfurization experiments using [Ni(NP$^t$Bu$_3$)]$_4$, using NaH and KH, respectively, as basic scavengers.

TABLE 2

Desulfurization of DBT in the presence of various scavengers.

| Entry | Mass DBT mg (mmol) | Base | Mass of Base mg (mmol) | Mass [Ni(NP$^t$Bu$_3$)]$_4$ mg (mmol) | Time (h) | % Conversion Ar—H | Ar—SH |
|---|---|---|---|---|---|---|---|
| 1 | 100 (0.54) | NaH | 27 (1.12) | 10 (0.009) | 8 | 13 | 0 |
| 2 | 100 (0.54) | KH | 46 (1.12) | 10 (0.009) | 8 | 28 | 18 |

Example 9

Hydrodesulfurization of Dibenzothiophene Under Different Pressure and Temperature Conditions This is a general procedure employed in the examples for the HDS of dibenzothiophene under varying pressure and temperature conditions, as shown below.

The preparation of reaction mixtures is conducted under an inert atmosphere, for example, in an Argon or nitrogen drybox. The desired amount of substrate, catalyst and basic scavenger, as indicated in Table 3, are mixed in toluene (5 to 10 mL). The mixture is transferred into the appropriate pressure reactor equipped with a Teflon magnetic stir bar. Hydrodesulfurization reaction examples run under hydrogen pressures lower than 2 atm are carried out in medium-walled glass pressure reactors, while processes employing pressures higher than 2 atm are contained in a glass-lined steel autoclave. The reaction vessels are charged with $H_2$, employing strict inert-atmosphere laboratory techniques, and heated to the desired temperature in an oil bath on a heating magnetic stir plate, stirring at 1200 rpm.

After the desired reaction time, the reaction mixture is cooled to room temperature and then quenched with a 10% HCl solution. The organic products are extracted through a series of diethyl ether-water extractions and the organic fractions are pooled, dried with anhydrous $Na_2SO_4$ and filtered through a small column of Florisil. The solvent is removed in vacuo and the weighed residue is dissolved in $CDCl_3$ for $^1$H-NMR and GC-MS analyses. The percentage recovery (yield) of HDS products is determined by conducting experiments that have been allowed to proceed to completion.

Hydrogen pressures and temperatures employed in these reactions can vary over considerable range, which would be apparent to a person skilled in the art, based upon the teachings of this disclosure and the common general knowledge in the field of chemical catalysis.

Table 3 shows some examples of $[Ni(NP^tBu_3)]_4$-catalyzed dibenzothiophene HDS and the corresponding process conditions employed. The examples are conducted using the general HDS procedure described in Example 9. Examples that proceeded to completion, exemplified by entries 1 to 3, gave isolated ranging from 95 to 97%.

was carried out over a longer reaction time, resulting in increased conversion of DBT to the products biphenyl and thiobiphenyl.

Example 10

Hydrodesulfurization of 4,6-diethyldibenzothiophene

The preparation of reaction mixtures is conducted under an inert atmosphere, for example, in an Argon dry box. A Teflon-sealed reactor, is charged with the amounts of substrate, catalyst, basic scavenger (indicated in Table 5), magnetic stir bar, and toluene (5 to 10 mL). The reactor is taken out of the dry box and connected to a hydrogen manifold. The reaction vessel is then charged with $H_2$ (1 atm), employing strict inert-atmosphere laboratory techniques. The reaction mixture is stirred at a rate of 1200 rpm in an oil bath at 120° C.

The reactor is cooled to room and quenched with a 10% HCl solution. The organic products are extracted through diethyl ether-water extractions using three 4 mL portions of diethyl ether. The diethyl ether fractions are pooled, dried with anhydrous $Na_2SO_4$ and filtered through a small column of Florisil. The diethyl ether is removed in vacuo, the residue weighed, and then dissolved in $CDCl_3$ for $^1$H-NMR and GC-MS analyses.

Examples of the HDS of 4,6-diethyldibenzothiophene catalyzed by $[Ni(NP^tBu_3)]_4$ and $[Co(NP^tBu_3)]_4$ are presented in Table 5. With the sterically hindered thiophene core, the desulfurization of 4,6-diethyldibenzothiophene was observed to be slower than the HDS of dibenzothiophene.

TABLE 3

Summary of HDS experiments of DBT catalyzed by $[Ni(NP^tBu_3)]_4$ in toluene

| Entry | DBT mg (mmol) | Cat mg (mmol) | KH mg (mmol) | $H_2$ (atm) | Temp (° C.) | Time (h) | % Conversion Ar—H | Ar—SH |
|---|---|---|---|---|---|---|---|---|
| 1 | 60 (0.33) | 9 (0.008) | 55 (1.37) | 24 | 140 | 18 | 100 | 0 |
| 2 | 74 (0.40) | 10 (0.009) | 60 (1.50) | 17 | 135 | 24 | 100 | 0 |
| 3 | 90 (0.49) | 10 (0.009) | 60 (1.50) | 2 | 135 | 18 | 82.1 | 8.4 |
| 4 | 90 (0.49) | 9 (0.009) | 60 (1.50) | 1 | 120 | 8.5 | 23.1 | 8.5 |
| 5 | 80 (0.43) | 9 (0.009) | 60 (1.50) | 1 | 110 | 20 | 58.3 | 4.1 |

The activity of catalysts $[Co(NP^tBu_3)]_4$ and the $[Ni(NP^tBu_3)]_4$ for dibenzothiophene HDS was compared. The reactions were carried out using the general HDS procedure described in Example 9. Table 4 presents the results of these experiments:

These results show that despite the use of the sterically large tri(tert-butyl)phosphoranimide ligand, the Ni(I) and Co(I) catalysts are capable of accessing and desulfurizing sterically hindered sulfur centres: both catalysts mediate HDS of 4,6-diethyldibenzothiophene under similarly mild reaction con-

TABLE 4

Comparison of the HDS activity of $[Co(NP^tBu_3)]_4$ and $[Ni(NP^tBu_3)]_4$ conditions.

| Entry | Cat | DBT mg (mmol) | Catalyst mg (mmol) | KH mg (mmol) | Time (h) | Temp (° C.) | Conversion (%) Ar—H | Ar—SH |
|---|---|---|---|---|---|---|---|---|
| 1 | $[Ni(NP^tBu_3)]_4$ | 100 (0.54) | 10 (0.009) | 50 (1.25) | 8 | 120 | 23.1 | 8.5 |
| 2 | $[Co(NP^tBu_3)]_4$ | 100 (0.54) | 10 (0.009) | 50 (1.25) | 8 | 120 | 21.0 | 52.2 |
| 3 | $[Co(NP^tBu_3)]_4$ | 100 (0.54) | 10 (0.009) | 50 (1.25) | 15 | 120 | 39.8 | 52.9 |

Entry 3 (Table 4) shows a cobalt-catalyzed HDS of dibenzothiophene, employing the method described above, that ditions, producing 3,32-diethylbiphenyl, accompanied by the incompletely converted thiol, 3,32-diethyl-2-thiobiphenyl.

TABLE 5

Summary of Hydrodesulfurization of 4,6-diethylDBT

| | Substrate | | Cat | KH | $H_2$ | Temp | Time | % Conversion | |
|---|---|---|---|---|---|---|---|---|---|
| | mg (mmol) | Catalyst | mg (mmol) | mg (mmol) | (atm) | (° C.) | (h) | Ar—H | Ar—SH |
| 1 | 60 (0.25) | [Ni(NP$^t$Bu$_3$)]$_4$ | 10 (0.009) | 30 (0.75) | 34 | 140 | 18 | 39.4 | 0 |
| 3 | 35 (0.15) | [Ni(NP$^t$Bu$_3$)]$_4$ | 14 (0.014) | 18 (0.45) | 1 | 120 | 18 | 44.1 | 0.2 |
| 5 | 25 (0.10) | [Ni(NP$^t$Bu$_3$)]$_4$ | 13 (0.012) | 13 (0.32) | 1 | 120 | 36 | 77.6 | 0.8 |
| 2 | 74 (0.31) | [Ni(NP$^t$Bu$_3$)]$_4$ | 9 (0.008) | 37 (0.92) | 1 | 110 | 16 | 17.3 | 0.5 |
| 4 | 45 (0.19) | [Co(NP$^t$Bu$_3$)]$_4$ | 10 (0.009) | 23 (0.57) | 1 | 120 | 18 | 21.3 | 5.6 |

Example 11

Hydrodesulfurization of Thiophene

The preparation of reaction mixtures is conducted under an inert atmosphere, for example, in an Argon dry box. A Teflon-sealed reactor, equipped with a Teflon-sealed magnetic stir bar, is charged with 120 mg (1.43 mmol) thiophene, 12 mg (0.011 mmol) [Ni(NP$^t$Bu$_3$)]$_4$, 115 mg (2.87 mmol) KH and 8 mL toluene. The reactor is taken out of the dry box and connected to a hydrogen manifold. The reaction vessel is then charged with $H_2$ (1 atm), employing strict inert-atmosphere laboratory techniques. The reaction mixture is stirred vigorously at 1200 rpm for 16 hours in an oil bath at 120° C.

The reactor is cooled to −35° C. and the reaction mixture quenched with a 10% HCl solution. The temperature of the reaction mixture is maintained at −35° C. and a fraction of the organic layer is extracted and submitted for GC-MS analysis. Results of the GC-MS analysis show the presence of a single HDS product component with the GC retention time and EIMS M$^+$ peak corresponding to the molar mass of the hydrocarbon 2-butene ($C_4H_8$).

Example 12

Hydrodesulfurization of 2-phenyl-3,5-dimethylthiophene

The preparation of reaction mixtures is conducted under an inert atmosphere, for example, in an Argon dry box. A Teflon-sealed reactor is charged with a stir bar, 120 mg (0.64 mmol) 2-phenyl-3,5-dimethylthiophene, 12 mg (0.011 mmol) [Ni(NP$^t$Bu$_3$)]$_4$, 55 mg (1.37 mmol) KH and 8 mL toluene. The reactor is then taken out of the dry box and connected to a hydrogen manifold. The reaction vessel is then charged with $H_2$ (1 atm), employing strict inert-atmosphere laboratory techniques. The reaction mixture is stirred vigorously at 1200 rpm for 16 hours in an oil bath at 120° C.

The reactor is cooled to room and the reaction mixture quenched with a 10% HCl solution. The organic products are extracted through diethyl ether-water extractions using three 4 mL portions of diethyl ether. The diethyl ether fractions are pooled, dried with anhydrous $Na_2SO_4$ and filtered through a small column of Florisil. The diethyl ether is removed in vacuo and, after weighing, the residue is dissolved in CDCl$_3$ for $^1$H-NMR and GC-MS analyses.

The GC-MS analysis reveals the presence, exclusively, of product components with GC retention times and EIMS M$^+$ values corresponding to HDS products of chemical formula: $C_{12}H_{14}$ and $C_{12}H_{16}$ in 3% and 23% yields, respectively.

Example 13

Hydrodesulfurization of Benzothiophene

The preparation of reaction mixtures is conducted under an inert atmosphere, for example, in an Argon dry box. A Teflon-sealed reactor is charged with 100 mg (0.75 mmol) benzothiophene, 16 mg (0.015 mmol) [Ni(NP$^t$Bu$_3$)]$_4$, 60 mg (1.50 mmol) KH, 8 mL toluene, and a stir bar. The reactor was taken out of the dry box and connected to a hydrogen manifold. The reaction vessel is then charged with $H_2$ (1 atm), employing strict inert-atmosphere laboratory techniques. The reaction mixture is then stirred at a 1200 rpm for 16 hours in an oil bath at 110° C.

The reactor is cooled to −35° C. and the reaction mixture quenched with a 10% HCl solution. The temperature of the reaction mixture is maintained at −35° C. and a fraction of the organic layer is submitted for GC-MS analysis. Results of the GC-MS analysis show the presence of ethylbenzene ($C_8H_{10}$) at 41.4% yield, after normalization, as the exclusive product component.

Example 14

Hydrodesulfurization of 6-methoxy-2-(4-methoxyphenyl)-1-benzothiophene

The preparation of reaction mixtures is conducted under an inert atmosphere, for example, in an Argon dry box. A Teflon-sealed reactor is charged with 106 mg (0.40 mmol) 6-methoxy-2-(4-methoxyphenyl)-1-benzothiophene, a magnetic stir bar, 20 mg [Ni(NP$^t$Bu$_3$)]$_4$ (0.019 mmol), 50 mg (1.25 mmol) KH and 8 mL toluene. The reactor was taken out of the dry box and connected to a hydrogen manifold. The reaction vessel is then charged with $H_2$ (1 atm), employing strict inert-atmosphere laboratory techniques. The reaction mixture is then stirred at 1200 rpm for 16 hours in an oil bath at 120° C.

The reactor is cooled to room and quenched with a 10% HCl solution. The organic products are extracted through diethyl ether-water extractions using three 4 mL portions of diethyl ether. The diethyl ether fractions are pooled, dried with anhydrous $Na_2SO_4$ and filtered through a small column of Florisil. The diethyl ether is removed in vacuo and the residue is dissolved in CDCl$_3$ for $^1$H-NMR and GC-MS analyses.

The hydrogenolysis of 6-methoxy-2-(4-methoxyphenyl)-1-benzothiophene with nickel(I) catalyst [Ni(NP$^t$Bu$_3$)]$_4$ proceeded to completion under the stated conditions, giving quantitative hydrodesulfurization. A mixture of sulfur-free products was obtained after 98.4% overall substrate conversion, consisting of 1,2-bis(4-methoxyphenyl)ethane (82.7%) and 1,2-bis(4-methoxyphenyl)ethane, (3.6%), 1-phenyl-2-(4-methoxyphenyl)ethane (9.4%) and 1-(4-hydroxyphenyl)-2-(4-methoxyphenyl)ethene (2.7%), as revealed by GC-MS analysis.

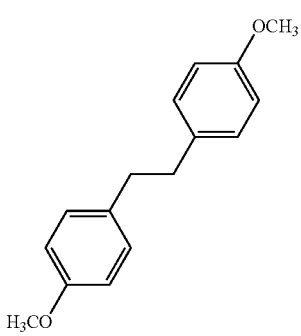

(82.7%)

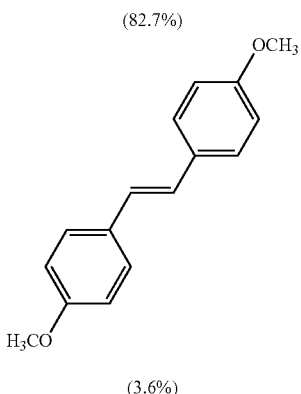

(3.6%)

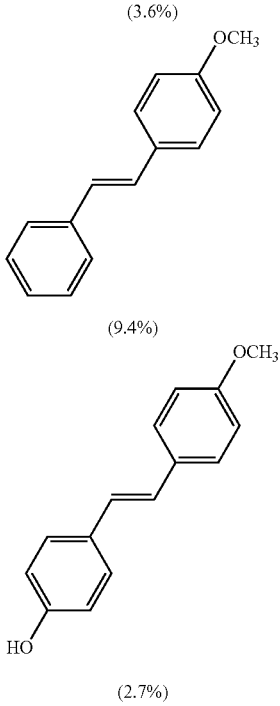

(9.4%)

(2.7%)

Example 15

Hydrodesulfurization of Phenoxathiin

The preparation of reaction mixtures is conducted under an inert atmosphere, for example, in an Argon dry box. A Teflon-sealed reactor is charged with 60 mg (0.30 mmol) phenoxathiin, 10 mg (0.009 mmol) [Ni(NP$^t$Bu$_3$)]$_4$, 50 mg (1.25 mmol) KH, a Teflon magnetic stir bar, and 8 mL toluene. The reactor is then taken out of the dry box and connected to a hydrogen manifold. The reaction vessel is then charged with H$_2$ (1 atm), employing rigorous inert-atmosphere laboratory techniques. The reaction mixture is then stirred at 1200 rpm for 16 hours in an oil bath at 110° C.

The reactor is cooled to room and the reaction mixture quenched with a 10% HCl solution. The organic products are extracted through diethyl ether-water extractions using three 4 mL portions of diethyl ether. The diethyl ether fractions are pooled, dried with anhydrous Na$_2$SO$_4$ and filtered through a small column of Florisil. The diethyl ether is removed in vacuo and the weighed residue dissolved in CDCl$_3$ for $^1$H-NMR and GC-MS analyses. The products obtained from this reaction (after 56% total conversion) are, in descending order of yield, phenol (36%), benzene (10.3%), dibenzofuran (6.3%), biphenyl (0.6%), and diphenyl ether (0.4%).

Example 16

Hydrodesulfurization of Diphenyl Sulfide

The preparation of reaction mixtures is conducted under an inert atmosphere, for example, in an Argon dry box. A Teflon-sealed reactor is charged with 60 mg (0.32 mmol) diphenyl sulfide, 10 mg (0.0009 mmol) [Ni(NP$^t$Bu$_3$)]$_4$ (or [Co(NP$^t$Bu$_3$)]$_4$), 30 mg (0.75 mmol) KH, 8 mL toluene and a Teflon-magnetic stir bar. The reactor was taken out of the dry box and connected to a hydrogen manifold. The reaction vessel is then charged with H$_2$ (1 atm), employing inert-atmosphere laboratory techniques. The reaction mixture is then stirred at 1200 rpm for 16 hours in an oil bath at 110° C.

The reactor is cooled to room and the reaction mixture quenched with a 10% HCl solution. The organic products are extracted through diethyl ether-water extractions using three 4 mL portions of diethyl ether. The diethyl ether fractions are pooled, dried with anhydrous Na$_2$SO$_4$ and filtered through a small column of Florisil. The diethyl ether is removed in vacuo and the weighed residue is dissolved in CDCl$_3$ for $^1$H-NMR and GC-MS analyses. The results of these experiments are shown in Table 6. The reaction products produced mixtures of benzene (Ar—H) and thiophenol (Ar—SH).

TABLE 6

Comparison of the HDS activity of [Co(NP$^t$Bu$_3$)]$_4$ and [Ni(NP$^t$Bu$_3$)]$_4$ catalysts for the HDS of diphenylsulfide.

| Entry | Catalyst | PhSPh (mg) | Catalyst (mg) | KH (mg) | Time (h) | Temp (° C.) | Conversion (%) Ar—H | Ar—SH |
|---|---|---|---|---|---|---|---|---|
| 1 | [Ni(NP$^t$Bu$_3$)]$_4$ | 60 | 10 | 30 | 8.5 | 120 | 24 | 23 |
| 2 | [Co(NP$^t$Bu$_3$)]$_4$ | 60 | 10 | 30 | 8.5 | 120 | 39 | 61 |

Example 17

Method for Hydrodesulfurization of Dialkyl Thioethers

The preparation of reaction mixtures is conducted under an inert atmosphere, for example, in an Argon dry box. A Teflon-sealed reactor is charged with 120 mg (0.32 mmol) dodecyl sulfide, 10 mg (0.009 mmol) [Ni(NP$^t$Bu$_3$)]$_4$, 40 mg (1.00 mmol) KH, a magnetic stir bar, and 8 mL toluene. The reactor is taken out of the dry box and connected to a hydrogen manifold. The reaction vessel is then charged with H$_2$ (1 atm), employing strict inert-atmosphere laboratory techniques. The reaction mixture is then stirred at 1200 rpm for 16 hours in an oil bath at 110° C.

The reactor is cooled to room and the reaction mixture quenched with a 10% HCl solution. The organic products are extracted through diethyl ether-water extractions using three 4 mL portions of diethyl ether. The diethyl ether fractions are pooled, dried with anhydrous Na$_2$SO$_4$ and filtered through a small column of Florisil. The diethyl ether is removed in vacuo and the residue is dissolved in CDCl$_3$ for $^1$H-NMR and GC-MS analyses.

The products obtained from this HDS are dodecane (C$_{12}$H$_{26}$) and dodecene (C$_{12}$H$_{24}$) exclusively.

Example 18

Method for Hydrodesulfurization of Alkyl Aryl Thioethers

The preparation of reaction mixtures is conducted under an inert atmosphere, for example, in an Argon dry box. A Teflon-sealed reactor is charged with 80 mg (0.40 mmol) benzyl phenyl sulfide, 10 mg (0.0009 mmol) [Ni(NP$^t$Bu$_3$)]$_4$, 40 mg (1.00 mmol) KH, a Telfon magnetic stir bar, and 8 mL toluene. The reactor is taken out of the dry box and connected to a hydrogen manifold. The reaction vessel is then charged with H$_2$ (1 atm), employing strict inert-atmosphere laboratory techniques. The reaction mixture is then stirred at 1200 rpm for 16 hours in an oil bath at 110° C.

The reactor is cooled to room and the reaction mixture quenched with a 10% HCl solution. The organic products are extracted through diethyl ether-water extractions using three 4 mL portions of diethyl ether. The diethyl ether fractions are pooled, dried with anhydrous Na$_2$SO$_4$ and filtered through a small column of Florisil. The diethyl ether is removed in vacuo and the residue is dissolved in CDCl$_3$ for $^1$H-NMR and GC-MS analyses.

The products obtained from this reaction procedure are benzene, thiophenol and diphenyldisulfide, in descending order of yield.

Example 19

Method for Hydrodesulfurization Using In Situ-Derived [Fe(NeBu$_3$)]$_n$ Catalysts Synthesis of [Fe(NP$^t$Bu$_3$)]$_4$ from [Br$_2$Fe$_2$(μ-NP$^t$Bu$_3$)$_2$]:

0.05 mmol of [Br$_2$Fe$_2$(μ-NP-$^t$Bu$_3$)$_2$] is dissolved in 5 mL THF, stirred, and then treated with 0.06 mmol of Na using a 1% Na(Hg) reagent at −35° C. to room temperature 2 hours. The THF fraction of the mixture is separated from any remaining solid components.

The THF fraction is used directly as dissolved catalyst and solvent for the HDS of dibenzothiophene. The preparation of the reaction mixture is conducted under an inert atmosphere, for example, in a nitrogen-filled dry box. A Teflon-sealed reactor is charged with 100 mg (0.54 mmol) DBT, 45 mg (1.12 mmol) KH and 4 mL of the THF fraction containing the [Fe(NP$^t$Bu$_3$)]$_n$ catalyst. The reactor is taken out of the dry box and connected to a hydrogen manifold. The reaction vessel is then charged with H$_2$ (1 atm), employing strict inert-atmosphere laboratory techniques. The reaction mixture is then stirred at 1200 rpm for 17 hours in an oil bath at 120° C.

The reactor is cooled to room temperature and the reaction mixture quenched with a 10% HCl solution. The organic products are extracted through diethyl ether-water extractions using three 4 mL portions of diethyl ether. The diethyl ether fractions are pooled, dried with anhydrous Na$_2$SO$_4$ and filtered through a small column of Florisil. The diethyl ether is removed in vacuo and the residue is dissolved in CDCl$_3$ for $^1$H-NMR and GC-MS analyses. The process gave 50% conversion, to biphenyl (40%) and 2-phenylthiophenyl (10%) as the only observed products.

Example 20

Method for Hydrodesulfurization Using In Situ-Derived [Ni(NP$^t$Et$_3$)]$_n$ Catalysts Synthesis of [Ni(NP$^t$Et$_3$)]$_n$, from [BrNi(NPEt$_3$)]$_4$:

0.05 mmol of [BrNi(NP$^t$Bu$_3$)]$_4$ was dissolved in 5 mL toluene, stirred, and then treated with 0.06 mmol of Na using a 1% Na(Hg) reagent at −35° C. to room temperature 2 hours. The THF fraction of the mixture was separated from any remaining solid components.

The THF fraction from the synthesis above is used directly was used as solvent for the catalytic hydrodesulfurization of dibenzothiophene. The preparation of reaction mixture is conducted under an inert atmosphere, for example, in an Argon dry box. A Teflon-sealed reactor is charged with 100 mg (0.54 mmol) DBT, 45 mg (1.12 mmol) KH and 4 mL of the toluene fraction containing the [Ni(NP$^t$Et$_3$)]$_n$ catalyst, where n in the catalyst formula cannot be determined definitively. The reactor is taken out of the dry box and connected to a hydrogen manifold. The reaction vessel is then charged with H$_2$ (1 atm), employing strict inert-atmosphere laboratory techniques. The reaction mixture is then stirred at 1200 rpm for 16 hours in an oil bath at 120° C.

The reactor is cooled to room and the reaction mixture quenched with a 10% HCl solution. The organic products are extracted through diethyl ether-water extractions using three 4 mL portions of diethyl ether. The diethyl ether fractions are pooled, dried with anhydrous Na$_2$SO$_4$ and filtered through a small column of Florisil. The diethyl ether is removed in vacuo and the weighed residue dissolved in CDCl$_3$ for $^1$H-NMR and GC-MS analyses. The process as described gives 36% conversion and produces biphenyl (16%) and 2-phenylthiophenol (20%), exclusively, as products.

The invention claimed is:

1. A method of catalyzing a hydrodesulfurization reaction comprising:

reacting an organic substrate having at least one carbon-sulfur bond with a catalyst of general formula:

where:
M is a first row transition metal selected from Fe, Co and Ni having a +1 oxidation state;
n is a whole number of at least 2;
the ratio of M to R$_3$PN$^-$ ratio is 1:1;

R³PN⁻ is a monoanioinic phosphoranimide ligand of structure:

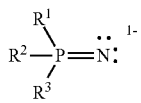

where:
R$^1$, R$^2$, R$^3$ can be the same group or different groups;
R$^1$, R$^2$, R$^3$ are independently alkyl (C1-18, primary, secondary or tertiary alkyl), cycloalkyl (C3-C8), aryl/heteroaryl, substituted aryl/heteroaryl or an inert functional group containing at least one heteroatom; and
R$^1$, R$^2$, R$^3$ may be linked to give cyclic systems.

2. The method of claim 1, wherein R$^1$, R$^2$, R$^3$ are independently alkyl groups selected from the group consisting of methyl, ethyl, n-propyl, isopropyl, sec-butyl and t-butyl.

3. The method of claim 2, wherein R$^1$, R$^2$, R$^3$ are t-butyl.

4. The method of claim 1, wherein R$^1$, R$^2$, R$^3$ are independently cycloalkyl groups selected from the group consisting of cyclopentyl, cyclohexyl, alkyl-substituted cyclopentyl and alkyl-substituted cyclohexyl.

5. The method of claim 4, wherein R$^1$, R$^2$, R$^3$ are independently cyclohexyl or cyclopentyl.

6. The catalyst of claim 1, wherein R$^1$, R$^2$, R$^3$ are aryl groups independently selected from the group consisting of phenyl, tolyl, xylyl, naphthanyl and biphenyl.

7. The method of claim 1, wherein the substrate is a dibenzothiophene, or a derivative thereof, having the general formula:

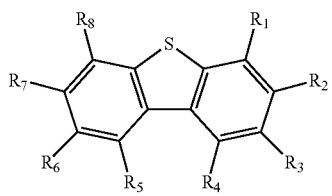

where:
R$^1$, R$^2$, R$^3$, R$^4$, R$^5$, R$^6$, R$^7$, R$^8$ are the same group or different groups selected from the group consisting of an alkyl (C1-18, primary, secondary or tertiary alkyl), cycloalkyl (C3-C8), aryl/heteroaryl, substituted aryl/heteroaryl and a functional group optionally containing at least one heteroatom selected from the group consisting of N, S and O; and wherein any two vicinal R groups may also be linked to give cyclic systems, both aliphatic and aromatic.

8. The method of claim 1, wherein the substrate is a thiophene, or a derivative thereof, having the general formula:

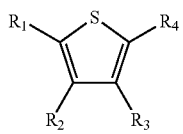

where:
R$^1$, R$^2$, R$^3$, R$^4$ can be the same group or different groups selected from the group consisting of alkyl (C1-18, primary, secondary and tertiary alkyl), cycloalkyl (C3-C8), aryl/heteroaryl, substituted aryl/heteroaryl and a functional group optionally containing at least one heteroatom selected from the group consisting of O, N and S, and wherein any two vicinal R groups may also be linked to give cyclic systems, both aliphatic and aromatic.

9. The method of claim 1, wherein the substrate is a benzothiophene, or a derivative thereof, having the general formula:

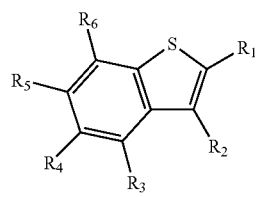

where:
R$^1$, R$^2$, R$^3$, R$^4$, R$^5$, R$^6$ are the same group or different groups selected from the group consisting of alkyl (C1-18, primary, secondary or tertiary alkyl), cycloalkyl (C3-C8), aryl/heteroaryl, substituted aryl/heteroaryl and a functional group optionally containing at least one heteroatom selected from the group consisting of O, N and S and wherein any two vicinal R groups may also be linked to give cyclic systems, both aliphatic and aromatic.

10. The method of claim 1, wherein the substrate is a diaryl sulfide ether where the aryl groups are connected, or a derivative thereof, having the general formula:

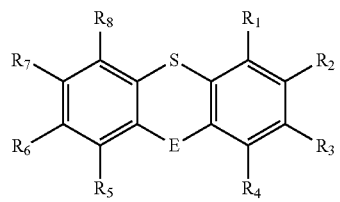

where:
E=O, S or NR$^9$
R$^1$, R$^2$, R$^3$, R$^4$, R$^5$, R$^6$, R$^7$, R$^8$, R$^9$ are the same group or different groups selected from the group consisting of alkyl (C1-18, primary, secondary or tertiary alkyl), cycloalkyl (C3-C8), aryl/heteroaryl, substituted aryl/heteroaryl or a functional group optionally containing at least one heteroatom selected from the group consisting of N, O and S; and wherein any two vicinal R groups may also be linked to give cyclic systems, both aliphatic and aromatic.

11. The method of claim 1, wherein the substrate is a sulfide ether, or a derivative thereof, having the general formula:

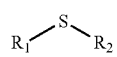

where:
R$^1$, R$^2$ can be the same group or different groups independently selected from the group consisting of alkyl (C1-18, primary, secondary or tertiary alkyl), cycloalkyl (C3-

C8), aryl/heteroaryl, substituted aryl/heteroaryl or a functional group optionally containing at least one heteroatom selected from the group consisting of S, N or O; and $R^1$ and $R^2$ may also be linked to give cyclic systems, both aliphatic and aromatic.

12. The method of claim 1, wherein the ratio of substrate to catalyst ranges from greater than 1000:1 to less than 1:1.

13. The method of claim 1, wherein the reacting is conducted in the presence of a reducing agent selected from the group consisting of hydrogen, dihydrogen and an organosilyl hydride.

14. The method of claim 1, wherein the reacting is conducted at a temperature range of about 90 to 300° C.

15. The method of claim 1, wherein the reacting is done in the presence of an inert solvent selected from the group consisting of an alkyl hydrocarbon solvent, an aromatic hydrocarbon solvent and an alkyl ether solvent.

16. The method of claim 1, wherein the reacting is carried out in the presence of a basic $H_2S$ scavenger selected from the group consisting of a metal hydride, metal amide, an alkyl halide and an aryl magnesium halide.

17. The method of claim 1, wherein the catalyst has been prepared in situ by the reaction below, and is used without purification in the reaction:

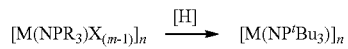

where:
[M(NPR$_3$)X$_{(m-1)}$]$_n$ is a halide—functionalized metal—phosphoranimide complex
where
NPR$_3$ is the monoanioinic phosphoranimide ligand as defined in claim 1
m=2 or 3;
n=2 to 4;
the M to R$^3$PN$^-$ ratio is 1:1;
M is a first row transition metal selected from Fe, Co and Ni;
X$^-$ is a halide or pseudohalide;
$R^1$, $R^2$, $R^3$ can be the same group or different groups;
$R^1$, $R^2$, $R^3$=alkyl (C1-18, primary, secondary and tertiary alkyl), cycloalkyl (C3-C8), aryl/heteroaryl, substituted aryl/heteroaryl and an inert functional group optionally containing at least one heteroatom selected from a Group 14, Group 15 and Group 16 element except for C; and
$R^1$, $R^2$, $R^3$ substituents may also be linked by aliphatic hydrocarbyl groups to give cyclic systems;
[H] is a reducing agent.

18. The method of claim 17, wherein X$^-$ is F$^-$, Cl$^-$, Br$^-$, I$^-$, or OSO$_2$R$^-$, where R=Me, Ph, p-Tol, CF$_3$.

19. A method of catalyzing the hydrodesulfurization of an organic compound having at least one carbon-sulfur bond comprising:
reacting the organic substrate with a compound selected from the group consisting of [Fe(NP$^t$Bu$_3$)]$_4$, [Co(NP$^t$Bu$_3$)]$_4$ and [Ni(NP$^t$Bu$_3$)]$_4$.

20. The method of claim 19, wherein the substrate is selected from a dibenzothiophene, a phenoxathiin, a diacyl sulfide, a diaryl ether and a thiophene.

21. A method of catalyzing the hydrodesulfurization of an organic substrate comprising:
reacting the organic substrate with a catalyst of Formula [M(NPR$_3$)]$_n$ wherein n is a whole number of at least 2;
the ratio of M to NPR$_3$ is 1:1;
M is a first row transition metal selected from the group consisting of Fe, Co and Ni;
NPR$_3$ is:

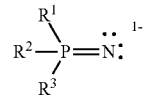

where:
$R^1$, $R^2$, $R^3$ are independently alkyl (C1-18, primary, secondary or tertiary alkyl), cycloalkyl (C3-C8), aryl/heteroaryl, substituted aryl/heteroaryl and an inert functional group containing at least one heteroatom selected from the group consisting of a Group 14, Group 15 and Group 16 element, excluding C; and
wherein $R^1$, $R^2$, $R^3$ may also be linked by aliphatic groups to give cyclic systems;
wherein the reaction is carried out at a temperature range of about 90 to 300° C. in the presence of a reducing agent selected from the group consisting of hydrogen and an organic silyl hydride; and
wherein the reaction is carried out in toluene or tetrahydrofuran.

22. A process for hydrodesulfurization of an organic substrate having at least carbon-sulfur bond comprising:
(i) combining the said organic substrate with a transition metal complex of Formula I and a reductant selected from hydrogen and an organic silyl hydride to obtain a reaction medium;
(ii) allowing the catalyst to catalyze the hydrodesulfurization of the substrate in an organic substrate selected from toluene and tetrahydrofuran;
(iii) obtaining the desulfurized products derived from the organic substrate;
wherein the organic substrate is an aromatic or aliphatic compound containing at least one carbon-sulfur bond; and wherein the ratio of the catalyst to the organic substrate is less than 1:1, and
wherein the complex of Formula I is:

[M(NPR$_3$)]$_n$      Formula I where
n is a whole number of at least 2;
the ratio of M to NPR$_3$ is 1:1;
M is a first row transition metal selected from the group consisting of Fe, Co and Ni;
NPR$_3$ is:

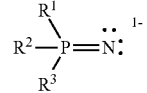

where:
$R^1$, $R^2$, $R^3$ are independently alkyl (C1-18, primary, secondary or tertiary alkyl), cycloalkyl (C3-C8), aryl/heteroaryl, substituted aryl/heteroaryl or an inert functional group containing at least one heteroatom selected from the group consisting of a Group 14, Group 15 and Group 16 element except for C; and wherein $R^1$, $R^2$, $R^3$ may also be linked by aliphatic groups to give cyclic systems.

* * * * *